Patented Jan. 25, 1949

2,460,241

UNITED STATES PATENT OFFICE 2,460,241

BASIC LEAD SULFATE PIGMENT

Adrian Richard Pitrot, Hempstead, N. Y., assignor to National Lead Company, New York, N. Y., a corporation of New Jersey No Drawing. Application February 5, 1947, Serial No. 726,741

7 Claims. (Cl. 106—297)

This invention relates to an improved basic lead sulphate pigment and to a novel process for manufacturing this new pigment.

Basic lead sulphate has long been known as a paint pigment. It is prepared commercially, generally by either volatilizing lead sulphide ores, or pig lead and sulphur, in a suitable furnace and collecting the product as a finely divided sublimed basic lead sulphate, or adding sulphuric acid to a slurry of lead oxide which contains a small amount of basic lead acetate, such as is described in the patent issued to Alex Stewart, No. 2,249,330, dated July 15, 1941. The composition of basic lead sulphate as made by either of these processes is commonly a mixture of monobasic and normal lead sulphate, and it may contain from 1 to 3 mols of normal lead sulphate for each mol of monobasic lead sulphate present.

The film forming characteristics of basic lead sulphates are largely dependent on their basicity. The more highly basic compounds, however, are not generally employed in paints because of their extreme reactivity with drying oil vehicles. For this reason, lead sulphate pigments generally tend to contain more of the normal lead sulphate, and as a consequence, are definitely deficient in weathering properties compared, for instance, to basic lead carbonate white lead. As a result of the comparatively poor weathering properties of these sulphate pigments, they have been almost exclusively used in mixed pigment formulations in which their deficiencies are tempered by the substantial presence of other pigments. While basic lead carbonate white lead may be used as a single pigment in paint formulations and excellent weathering qualities obtained, it has never been heretofore possible to use basic lead sulphate alone as the pigment phase because of its inherently poor weathering qualities which are generally manifested by early chalking and cracking of the film.

It is, therefore, the principal object of this invention to provide a new and improved basic lead sulphate pigment having superior weathering properties compared to basic lead sulphate used heretofore. It is a further object of this invention to provide a basic lead sulphate pigment which may be used alone as the pigment portion of a surface coating composition. It is another object of this invention to provide a novel process for manufacturing this improved basic lead sulphate pigment. These and other objects of this invention will become apparent from the following description.

This invention in its broadest aspects contemplates the formation of an intimate mixture of basic lead sulphate and aluminum oxide, or an aluminum salt which will yield aluminum oxide on heating, and the subsequent calcination of this mixture at a temperature between about 900 and about 1000° C., and preferably about 950° C., to form a combined basic lead sulphate aluminum oxide composition having superior pigment properties.

The intimate mixture of aluminum oxide may be obtained by several methods. Aluminum oxide, or an aluminum oxide containing salt may be finely ground and thoroughly mechanically mixed with commercial basic lead sulphate; or the aluminum oxide may be introduced, as such or in the form of an aluminum oxide containing salt, in some stage of the process used for manufacturing basic lead sulphate so that the product will comprise an intimate mixture. It is much preferred, however, to form the mixture by the novel method to be described in detail below in which a sulphate salt of aluminum is reacted with lead oxide to form basic lead sulphate and simultaneously to precipitate aluminum hydrate in situ. It is not necessary that the alumina be present in the form of $Al_2O_3$ prior to calcination of the mixture, and it may be convenient to use a salt such as aluminum hydrate, or aluminum sulphate which, at the calcination temperature employed will decompose to form aluminum oxide. An amount of aluminum salt should be used which will give from about 2% to about 10% aluminum oxide in the final product, preferably about 8%.

In the preferred process of this invention, lead oxide is first added and mixed with sufficient water to make a slurry. A small amount, which may be between about 1 to about 5% of the weight of the lead oxide and preferably about 3% of acetic acid is then added to form lead acetate in solution and accelerate the reaction. A solution of aluminum sulphate is then slowly added while agitating and maintaining the temperature of the slurry between about 55° C. and about 85° C. The amount of aluminum sulphate added is such that the sulphate portion thereof is sufficient to form the desired composition of basic lead sulphate when combined with the lead oxide. The resulting precipitate is then washed to remove soluble acetate salts and then is filtered and dried or partially dried, or simply filtered, to form a mixture suitable for calcination. It should be noted that the addition of the aluminum sulphate solution to the lead oxide slurry accomplishes two objects simultaneously; first, the sulphate radical combines with the PbO to form basic lead sulphate and, second, aluminum hydroxide is precipitated in situ resulting in an extremely well dispersed mixture.

It will be appreciated that when using the method described above, wherein aluminum sulphate is added to a slurry of lead oxide, the relative proportions of $SO_4$ and $Al_2O_3$ in the final product are interdependent. When using this method for the manufacture of basic lead sulphates of ordinary composition, that is those containing from 1 to 3 mols of normal lead sulphate for each mol of monobasic lead sulphate present, the $Al_2O_3$ content will vary from 7.6% to 8.6%. If the desired product approaches the composition of normal lead sulphate, the alumina content will approach 10%. If on the other hand, the more basic lead sulphate compounds are to be formed, the alumina content will be correspondingly lowered. If it is desired to prepare compositions containing high sulphate content and low alumina content, a solution of aluminum sulphate and sulphuric acid may be used for precipitation to produce a mixture of the desired composition. If the more basic sulphates containing high alumina content are desired, it may be advantageous to add additional aluminum hydroxide to the mixture or to add it dispersed in or mixed with the aluminum sulphate solution.

The mixture of basic lead sulphate and alumina or the alumina containing salt is then calcined at a temperature between about 900° C. and about 1000° C., preferably about 950° C. It will be found that temperatures appreciably lower than this are not effective in producing the combination of the alumina and basic lead sulphate, which is the product of this invention. At the same time, temperatures substantially higher than 1000° C. should not be used due to the possibility of melting or volatilizing the lead sulphate. At a temperature in the stated range, it will be found that the alumina reacts in some manner and to some extent with the lead monoxide or the lead sulphate present in the system. It has been found that when lower calcining temperatures are employed, the product exhibits excessively high oil absorption. The sharp drop in oil absorption of the pigment when calcined at about 950° C. indicates some consolidation of surface which suggests a chemical or physical reaction.

The actual nature of the reaction between the alumina and the basic lead sulphate is not clearly understood. It may be a chemical combination or a physical combination, such as a solid solution of the two components, or both. Since the combination is chemical and/or physical for convenience, it is herein referred to as a chemico-physical combination. It will be found necessary to maintain the pigment at calcination temperature for from about 3 to about 5 hours and preferably about 4 hours, to effect the desired combination. Since the pigment at this stage is finely divided, total furnacing time of large batches will undoubtedly be considerably longer, due to the slow heat penetration into this type of mass, as is well known. However, maintaining all parts of the charge at about 950° C. for about four hours will result in effective calcination, and the desired combination.

The effect of calcination on a mixture produced according to this invention is illustrated by the properties given in the following table which compares the same material calcined at different temperatures.

Table

|  | Uncalcined Mixture | Same Calcined at 845° C. | Same Calcined at 950° C. |
|---|---|---|---|
| Tinting Power [1] | 50 | 90 | 100. |
| Oil Absorption [2] | 28 | 22.4 | 14.2. |
| Color (whiteness) | equal to white lead standard. | better than white lead standard. | better than white lead standard. |
| PbO (Total) | 71.26 percent | 76.2 percent | 76.20 percent. |
| $SO_3$ (Total) | 15.52 percent | 16.34 percent | 16.34 percent. |
| $Al_2O_3$ | 7.08 percent | 7.60 percent | 7.60 percent. |
| Combined Water | 5.50 percent | none | none. |

[1] Determined according to the method given on page 44 of "Physical and Chemical Examination of Paints, Varnishes, and Lacquers," by H. A. Gardner and C. G. Sword, 10th edition, May, 1946.

[2] Determined according to the method given on page 289 of "Physical and Chemical Examination of Paints, Varnishes and Lacquers" by H. A. Gardner and C. G. Sword, 10th edition, May, 1946.

In order that this invention may be clearly understood, the following examples will show several methods of producing the product of this invention.

Example 1

790 grams of litharge bolted wet through a 100 mesh screen as added to a vessel containing approximately 7,600 ml. of water. Then 19 grams of (80%) acetic acid was added. The mixture was agitated sufficiently to keep the excess litharge in suspension and then heated to a temperature of approximately 70° C. Then 211.5 grams of (95%) sulfuric acid was diluted with water to a volume of approximately 500 ml. and added slowly over a period of approximately 3 hours, with continued agitation and with the temperatures maintained between 55° C. and 70° C. Then a slurry of finely divided aluminum hydroxide weighing 1158 grams and containing 116.24 grams aluminum hydroxide was added and the mixture stirred for approximately 3 hours.

The slurry was then filtered, washed with about 4 liters of water to remove any soluble acetate remaining. It was then dried and calcined in a muffle furnace at 950° C. for 4 hours.

Some physical and chemical properties of this substance are:

| | |
|---|---|
| Tinting power | 95 |
| Oil absorption | 10.3 |
| Color | Better than white lead standard |
| PbO (total) per cent | 76.30 |
| So | 16.00 |
| $So_3$ | 16.00 |
| $Al_2O_3$ | 7.74 |

Example II 528 grams of litharge, bolted wet through a 100 mesh screen was added to a vessel containing 4500 ml. of water and 15 g. of 80% acetic acid solution, forming basic lead acetate. The mixture was agitated sufficiently to keep the excess litharge in suspension and the slurry heated to a temperature of about 70° C. Then 271.4 g. of aluminum sulphate, $Al_2(SO_4)_3.18H_2O$ dissolved in 1500 ml. of water, was slowly added over a period of about 4 hours with constant agitation. The slurry was maintained at a temperature of between 55 and 75° C. throughout the reaction period. The precipitate formed was then filtered and washed with about 4 liters of cold water to remove soluble acetate salts. It was then dried and calcined in a muffle furnace at 950° C. for 4 hours. The product as made above showed the following properties:

| | |
|---|---|
| Tinting power | 100 |
| Oil absorption | 14.2 |

Color (whiteness) ____ Better than white lead standard
PbO (total) _____ per cent__ 76.20
SO₃ (total) _____ do____ 16.34
Al₂O₃ _____ do____ 7.60
Combined water _____ None When alumina is calcined in admixture with lead sulphates in the proportions mentioned above, the product shows improved pigment properties. When the product of Example II, for instance, was incorporated into a linseed oil vehicle, and when 3 coats of the resultant paint were applied to wood, a comparison with 3 coats of a standard formulation of basic carbonate white lead paint showed that after 33 months of outdoor exposure of test fences, the product of this invention had shown little or no signs of chalking, while white lead paint started to chalk at the end of 9 months, and at the conclusion of the test had chalked considerably. Furthermore, there was less chalking and minute cracking in the paint film formulation with the product of this invention than with the standard white lead paint.

The two paints described were formulated as follows:

|  | Improved Basic Lead Sulphate Pigment | Standard White Lead |
| --- | --- | --- |
|  | Per cent | Per cent |
| Pigment | 70.9 | 72.0 |
| Vehicle | 29.1 | 28.0 |
|  | 100.0 | 100.0 |

The vehicle in the aforementioned paints consisted of 87.6% linseed oil and 12.4% volatile thinner and drier in each case.

The basic lead sulphate product of this invention has therefore the very great advantage, over basic lead sulphate as heretofore manufactured, of having definitely superior weathering qualities. As has been shown by the result of the comparison test described, the weathering properties of the product of this invention are even superior to those of a basic carbonate white lead.

While this invention has been illustrated by the examples shown, it is not intended to restrict it specifically thereto and other modifications and embodiments may be used falling within the scope of the following claims.

I claim:

1. A pigment consisting essentially of basic lead sulphate having from about 2% to about 10% of aluminum oxide physico-chemically combined therewith.

2. A pigment consisting essentially of basic lead sulphate having about 8% aluminum oxide chemico-physically combined therewith.

3. A process for manufacturing basic lead sulphate-alumina pigment which comprises forming an intimate mixture of finely divided basic lead sulphate and an aluminum compound which on heating produces aluminum oxide in amount as to produce between about 2% and about 10% aluminum oxide in the mixture and heating the mixture at a temperature of between about 900° C. and about 1000° C. until chemico-physical combination is effected.

4. A process for manufacturing basic lead sulphate-alumina pigment which comprises forming an intimate mixture of finely divided basic lead and an aluminum compound which on heating produces aluminum oxide in amount as to produce between about 2% and about 10% aluminum oxide in the mixture and heating the mixture at a temperature between about 900° C. and about 1000° C. for a period of between about 3 and about 5 hours.

5. A process for manufacturing basic lead sulphate-alumina pigment which comprises intimately mixing finely divided basic lead sulphate with from about 2% to about 10% of alumina, and heating the mixture at a temperature between about 900° C. and about 1000° C. until said alumina is chemico-physically combined with said basic lead sulphate.

6. A process for manufacturing basic lead sulphate-alumina pigment which comprises slowly adding a sulphuric acid solution to a slurry of lead oxide, PbO, containing basic lead acetate, maintaining said slurry at a temperature between about 55° C. and about 85° C. and continually agitating the same until basic lead sulphate is formed, intimately mixing an aluminum compound which produces aluminum oxide on heating with said basic lead sulphate in amount so that between about 2% and about 10% of aluminum oxide will be present in the heated mixture and heating said mixture at a temperature of between about 900° C. and about 1000° C. for a period between about 3 and about 5 hours.

7. A process for manufacturing basic lead sulphate-alumina pigment which comprises forming a slurry of lead oxide, PbO, containing a small amount of basic lead acetate, slowly adding to said slurry a solution of aluminum sulphate, meanwhile agitating and maintaining the temperature between about 55 and about 85° C., to form a mixture containing basic lead sulphate and aluminum hydroxide, washing said mixture to remove acetate salts therefrom, and heating said washed mixture at a temperature between about 900° C. and about 1000° C. for a period between about 3 and about 5 hours.

ADRIAN RICHARD PITROT.

REFERENCES CITED

The following references are of record in the file of this patent:

UNITED STATES PATENTS

| Number | Name | Date |
| --- | --- | --- |
| 2,383,284 | Barton | Aug. 21, 1945 |